Dec. 1, 1931.  E. P. BARTHOLOMAY  1,834,673
GAS METER
Filed March 17, 1928
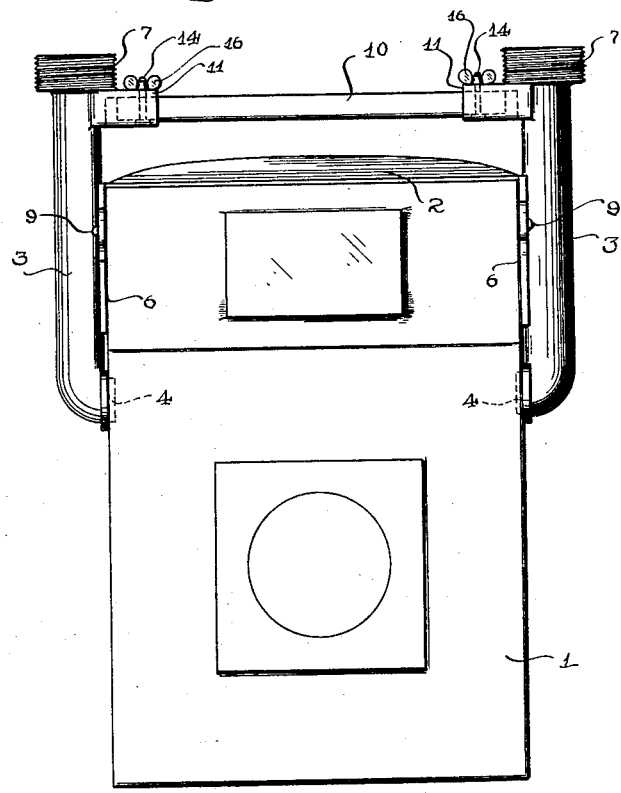
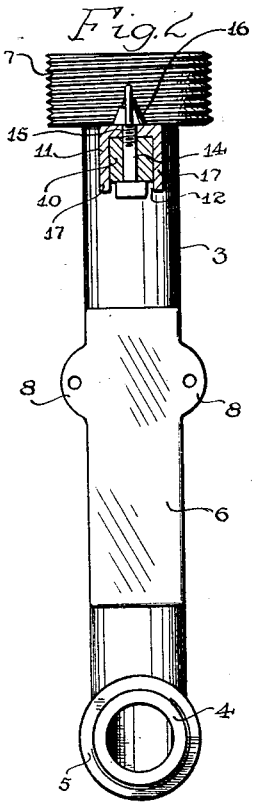
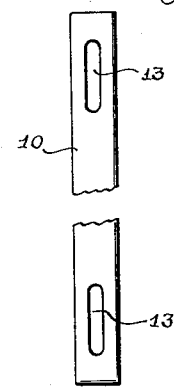
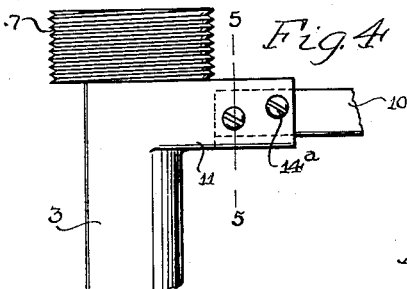
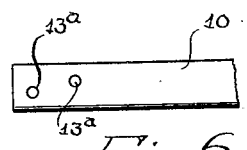
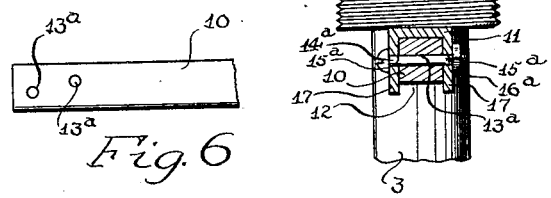
INVENTOR
Edward P. Bartholomay
BY
his ATTORNEY Patented Dec. 1, 1931

1,834,673

UNITED STATES PATENT OFFICE

EDWARD P. BARTHOLOMAY, OF ROCHESTER, NEW YORK

GAS METER

Application filed March 17, 1928. Serial No. 262,350.

The present invention relates to gas meters and more particularly to the type in which vertical pipe connections are arranged in contact with the opposite walls of the casing of the meter and connect with inlet and outlet openings in the side walls of the meter casing. An object of this invention is to provide a novel means of securing the pipe connections to the casing of the meter so that the possibility of leakage between these connections and the meter is reduced to a minimum. Another object of the invention is to provide a rigid connection between these pipe connections which will prevent the twisting strains on the pipe connections, produced during the installing or the removing of the meter, causing the disconnection of the pipe connections from the meter casing, the rigid connection being removable to permit the ready removal of the cover of the meter for the repair of the latter.

To these and other ends, the invention consists of certain parts and combinations of parts all of which will be hereinafter described: the novel features being pointed out in the appended claims.

In the drawings:

Fig. 1 is a view in elevation of a meter constructed in accordance with this invention;

Fig. 2 is an enlarged detail view of one of the pipe connections of the meter showing portions in section to illustrate the manner in which the connecting bar is secured to a pipe connection;

Fig. 3 is a fragmentary detail view of a connecting bar illustrated in Figs. 1 and 2;

Fig. 4 is a detail view of another embodiment of the invention illustrating a different manner of securing the connecting bar to the pipe connection;

Fig. 5 is a section on the line 5—5, Fig. 4; and

Fig. 6 is a fragmentary detail view of the connecting bar illustrated in Figs. 4 and 5.

In the illustrated embodiment of the invention, 1 indicates the meter casing and 2 a removable cover therefor. This casing has as usual openings on opposite sides providing the intake and the outlet for the meter.

One of the features of this invention is the construction of the pipe connections 3 through which the gas service pipes lead to and from the meter. In this instance, these pipe connections are in the form of vertical members arranged on opposite sides of the meter casing, their lower ends having laterally turned portions 4 which are projected into the inlet and the outlet openings in the opposite side walls of the meter casing as illustrated in dotted lines in Fig. 1. Surrounding this laterally projecting outlet is an annular seat 5 which rests against the wall of the meter about the opening and is soldered to such wall. Above this lateral extension, the side of the connection 3 is closed and is provided with a flattened portion 6, the surface of which lies in the plane with the surface of the seat 5 in order that it may also be soldered to a side wall of the meter to one side of the opening in such wall. The upper end of this connection projects above the cover or top wall 2 of the meter and is provided with an externally threaded portion 7 through which the gas service pipe may be connected. Lugs 8 may be extended laterally from the seat portion 6 on the side of the connection and may be secured by rivets 9 to such side wall. The soldering of the connection 3 at 5 and 6 to the side wall, the extension of the projection 4 into the opening in the side wall, and the securing of the connection by the rivets 9 form a rigid and gas tight connection between the pipe connection 3 and the meter casing.

The connection of the service pipe to the coupling portions 7 of the pipe connections 3 places upon the pipe connections 3 twisting strains which have a tendency to loosen or disconnect the pipe connections 3 from the meter casing. With the end in view of providing a rigid connection between the pipe connections independently of the meter casing without at the same time interfering with the ready removal of the cover 2 of the gas meter, there may be provided a connecting bar 10 made preferably of steel and detachably connected at its ends with those portions of the pipe connections 3 projecting above the meter. The detachable connecting means is such that the connecting bar 10 moves vertically or in the direction of the longitudinal axes of the pipe connections 3 in order to connect with or disconnect from the pipe connections, while support is provided between the pipe connections and the connecting bar which will impose the twisting strains on said bar rather than upon the fastening devices which secure the bar to the pipe connections.

In the embodiment of the invention shown in Fig. 1 each pipe connection 3 has a laterally extending arm 11 beyond the cover 2 of the gas meter and this arm has a pocket which opens at its outer end horizontally and opens vertically at 12 at its pocket. The bar 10 is moved vertically through the open bottom walls 12 of the pockets and when it is in proper position extends to the pockets through the opposed open ends of the latter. Any means may be employed for securing the bar removably in the pockets of the laterally extending arms 11. In the embodiment shown in Figs. 1 and 2, the bar has two slots 13 in their opposite ends and bolts 14 are passed through these slots from the under side of the bar and also through openings 15 in the top walls of the pockets, being held in position by thumb nuts 16. In the embodiment shown in Figs. 4, 5 and 6, the bar 10 has two horizontal openings 13ª and bolts 14ª are passed through openings 15ª in the vertical sides of the pockets and held in position by nuts 16ª. In both embodiments, the vertical walls 17 of the pockets cooperate with the vertical sides of the connecting bar 10 in such a manner that all twisting strains on the pipe connections 3 are imposed upon the removable connecting bar 10. It is apparent that the form of the cooperating portions on the connecting bar and the lateral extensions on the pipe connections may be varied in numerous ways to obtain the results of this invention.

From the foregoing it will be seen that there has been provided a novel means of securing pipe connections to the side walls of gas meter casings so that danger of leakage is reduced to a minimum. A novel removable rigid connection is provided between the pipe connections of gas meters which will permit the ready removal of the cover and ready access to the mechanism at the top of the meter without interference by the connecting means.

What I claim as my invention and desire to secure by Letters Patent is:

1. The combination with a gas meter casing having a circular opening in a vertical side wall, of a pipe connection extending vertically at one side of the casing and provided with an annular flange projecting into the circular opening and with a seat entirely surrounding said flange at right angles thereto and soldered to the side wall of the casing about the opening and means for securing the pipe connection to the side of the casing above the flange.

2. The combination with a gas meter casing having a circular opening in one of its vertical side walls, of an elongated pipe connection extending vertically along said side wall and having an annular flange projecting into said opening, a seat entirely surrounding the annular flange and soldered to the side wall entirely about the opening, and a longitudinally extending flat portion on the side adjacent the meter and in a plane with the surrounding seat, said flat portion also being soldered to the side wall of the meter casing.

EDWARD P. BARTHOLOMAY.